United States Patent
Balasubramanian et al.

(10) Patent No.: US 10,762,554 B2
(45) Date of Patent: Sep. 1, 2020

(54) FRAMED IMPLEMENTATION FOR PAYMENT WIDGETS

(71) Applicant: CardinalCommerce Corporation, Mentor, OH (US)

(72) Inventors: Chandra S. Balasubramanian, Shaker Heights, OH (US); Andrew Heiss, Mentor, OH (US)

(73) Assignee: CardinalCommerce Corporation, Mentor, OH (US)

( * ) Notice: Subject to any disclaimer, the term of this patent is extended or adjusted under 35 U.S.C. 154(b) by 147 days.

(21) Appl. No.: 15/597,942

(22) Filed: May 17, 2017

(65) Prior Publication Data
US 2017/0249691 A1 Aug. 31, 2017

Related U.S. Application Data

(62) Division of application No. 14/162,203, filed on Jan. 23, 2014, now Pat. No. 9,679,328.

(60) Provisional application No. 61/755,611, filed on Jan. 23, 2013.

(51) Int. Cl.
*G06Q 30/06* (2012.01)
*G06Q 20/32* (2012.01)

(52) U.S. Cl.
CPC ....... *G06Q 30/0635* (2013.01); *G06Q 20/322* (2013.01)

(58) Field of Classification Search
None
See application file for complete search history.

(56) References Cited

U.S. PATENT DOCUMENTS

| 7,051,002 | B2 | 5/2006 | Keresman, III et al. |
| 7,165,041 | B1 | 1/2007 | Guheen |
| 8,150,393 | B2 | 4/2012 | Murray |
| 8,170,921 | B2 | 5/2012 | Stocker |

(Continued)

FOREIGN PATENT DOCUMENTS

KR 10-2011-0035571 4/2011

OTHER PUBLICATIONS

Rydstedt et al. (Jul. 20, 2010). Busting frame busting: a study of clickjacking vulnerabilities on popular sites. Accessed on Dec. 5, 2019 at https://seclab.stanford.edu/websec/framebusting/framebust.pdf.*

(Continued)

*Primary Examiner* — Peter Ludwig
(74) *Attorney, Agent, or Firm* — The Webb Law Firm (57) ABSTRACT

A system and method process an electronic commerce transaction between a consumer and a merchant over a communications network. A checkout webpage of a virtual shopping cart of the merchant is displayed by a consumer device and an initialization routine of the checkout webpage is performed by the consumer device. The initialization routine segments the checkout webpage to display a widget webpage of a service provider within the checkout webpage. Content of the widget webpage is loaded and displayed independent of content of the checkout webpage. A bootstrap routine of the widget webpage is performed by the consumer device to add a payment widget to the widget webpage and to display the payment widget with the checkout webpage. Further, the transaction is processed by the consumer device to completion using the payment widget.

16 Claims, 3 Drawing Sheets

(56) References Cited

U.S. PATENT DOCUMENTS

| | | |
|---|---|---|
| 8,359,005 B2 | 1/2013 | Smith |
| 9,037,963 B1 | 5/2015 | Chandi |
| 9,324,098 B1 | 4/2016 | Agrawal |
| 2001/0037291 A1 | 11/2001 | Allen |
| 2006/0206589 A1* | 9/2006 | Lentini .................. G06F 15/16 709/219 |
| 2006/0282382 A1 | 12/2006 | Balasubramanian et al. |
| 2008/0034309 A1 | 2/2008 | Louch |
| 2008/0046429 A1 | 2/2008 | Punera |
| 2008/0148283 A1 | 6/2008 | Allen |
| 2009/0271289 A1 | 10/2009 | Klinger |
| 2009/0299878 A1* | 12/2009 | Keresman, III ....... G06Q 20/12 705/26.1 |
| 2009/0319387 A1 | 12/2009 | Keithley et al. |
| 2010/0095216 A1 | 4/2010 | Morse et al. |
| 2010/0242121 A1 | 9/2010 | Johnson et al. |
| 2011/0035345 A1 | 2/2011 | Duan |
| 2011/0087560 A1 | 4/2011 | West |
| 2011/0161201 A1 | 6/2011 | Stocker |
| 2011/0191210 A1 | 8/2011 | Blackhurst |
| 2011/0208550 A1 | 8/2011 | Lamarche |
| 2011/0307387 A1 | 12/2011 | Francia |
| 2012/0215701 A1* | 8/2012 | Mehta ................... G06Q 20/12 705/75 |
| 2012/0232973 A1 | 9/2012 | Robb |
| 2013/0151417 A1* | 6/2013 | Gupta ................. G06Q 20/382 705/65 |
| 2013/0290203 A1 | 10/2013 | Purves |
| 2013/0346302 A1* | 12/2013 | Purves ................ G06Q 20/102 705/40 |
| 2014/0249999 A1 | 9/2014 | Johnson |

OTHER PUBLICATIONS

Jonathan Tew, "UltraCart Advanced JavaScript Checkout API," UltraCart Documentation, docs ultracasr.com, Oct. 24, 2011, pp. 1-8.

Johnny Stenback, et al., "Document Object Model HTML," URL:https://www.w3.org/TR/DOM-Level-2-HTML/html.html, pp. 1-50, Jan. 9, 2003.

International Search Report dated May 8, 2014.

* cited by examiner

FRAMED IMPLEMENTATION FOR PAYMENT WIDGETS

This application is a divisional of, and claims priority to and the benefit of, U.S. patent application Ser. No. 14/162,203, filed on Jan. 23, 2014, which claims the benefit of U.S. Provisional Application No. 61/755,611, filed Jan. 23, 2013, incorporated herein by reference in its entirety.

BACKGROUND

The present invention relates to the art of electronic commerce (i.e., e-commerce). The present invention finds particular application in conjunction with the addition of payment widgets to merchant checkout webpages, and it will be described with particular reference thereto. It is to be appreciated, however, that the invention is also amenable to other like applications.

E-commerce relates to the buying and selling of products and/or services between consumers and merchants over a communications network, such as the Internet. The convenience and availability of shopping over the Internet has sparked considerable interest in e-commerce on behalf of both consumers and merchants.

During a typical e-commerce transaction, a consumer browses a virtual directory of products and/or services offered by a merchant over a communications network to identify desired products and/or services. Upon identifying a desired product and/or service, the consumer adds the product and/or service to a virtual shopping cart. Once the consumer has added all the desired products and/or services to the virtual shopping cart, the consumer proceeds to a checkout webpage of the virtual shopping cart.

The checkout webpage allows the consumer to pay the merchant for the products and/or services added to the virtual shopping card. Typically, payment is facilitated by a payment widget on the checkout webpage. A payment widget includes a set of graphical user interface (GUI) elements that allow the user to enter payment data needed to complete the transaction and a payment routine to process the payment data to complete the transaction. Typical GUI elements include, for example, text boxes, buttons, dialog boxes, pop-up windows, pull-down menus, icons, scroll bars, resizable window edges, progress indicators, selection boxes, windows, tear-off menus, menu bars, toggle switches and forms.

To load the payment widget, the checkout webpage typically includes one or more bootstrap routines, typically JavaScript code, executed when the consumer accesses the checkout webpage. The bootstrap routines initialize the payment widget and add the payment widget to the checkout webpage. One challenge with such an arrangement is that merchants often employ a distributed computing environment. Hence, bootstrap routines for the payment widget can be distributed, thereby providing slower load time and increasing errors.

Another challenge is that merchants often employ off-the shelf or third party hosted shopping carts. While merchants are typically able to update the presentation layer of the checkout webpages (i.e., update the visual appearance of the checkout webpages), merchants may not be able to update the business logic of the checkout webpages. Hence, JavaScript or Hypertext Transfer Protocol (HTTP) header options, for example, needed by the payment widgets may be unavailable.

The present application provides a new and improved system and method which overcome these problems and others.

INCORPORATION BY REFERENCE

U.S. Pat. No. 7,051,002, entitled "Universal Merchant Platform for Payment Authentication", and U.S. Patent Application Publication No. 2006/0282382, entitled "Universal Merchant Platform for Payment Authentication", are each incorporated herein by reference.

BRIEF DESCRIPTION

In accordance with one aspect of the present application, a system for processing an electronic commerce transaction between a consumer and a merchant over a communications network is provided. The system includes a consumer device configured to display a checkout webpage of a virtual shopping cart of the merchant and to perform an initialization routine of the checkout webpage. The initialization routine segments the checkout webpage to display a widget webpage of a service provider within the checkout webpage. Content of the widget webpage is loaded and displayed independent of content of the checkout webpage. The consumer device is further configured to perform a bootstrap routine of the widget webpage to add a payment widget to the widget webpage and to display the payment widget with the checkout webpage. Further, the consumer device is configured to process the transaction to completion using the payment widget.

In accordance with another aspect of the present application, a method for processing an electronic commerce transaction between a consumer and a merchant over a communications network is provided. A checkout webpage of a virtual shopping cart of the merchant is displayed by a consumer device and an initialization routine of the checkout webpage is performed by the consumer device. The initialization routine segments the checkout webpage to display a widget webpage of a service provider within the checkout webpage. Content of the widget webpage is loaded and displayed independent of content of the checkout webpage. A bootstrap routine of the widget webpage is performed by the consumer device to add a payment widget to the widget webpage and to display the payment widget with the checkout webpage. Further, the transaction is processed by the consumer device to completion using the payment widget.

In accordance with another aspect of the present application, a system for processing an electronic commerce transaction between a consumer and a merchant over a communications network is provided. The system includes at least one server of a service provider different than the merchant configured to provide an initialization routine of a checkout webpage. The checkout webpage is part of a virtual shopping cart of the merchant and displayed to the consumer. The initialization routine segments the checkout webpage to display a widget webpage of the service provider within the checkout webpage. Content of the widget webpage is loaded and displayed independent of content of the checkout webpage. The at least one server is further configured to provide a bootstrap routine of the widget webpage to add a payment widget to the widget webpage and to display the payment widget with the checkout webpage. Even more, the at least one server is configured to collect payment data from the consumer using the payment widget and to process the transaction to completion using the collected payment data.

DETAILED DESCRIPTION

Figure 1:
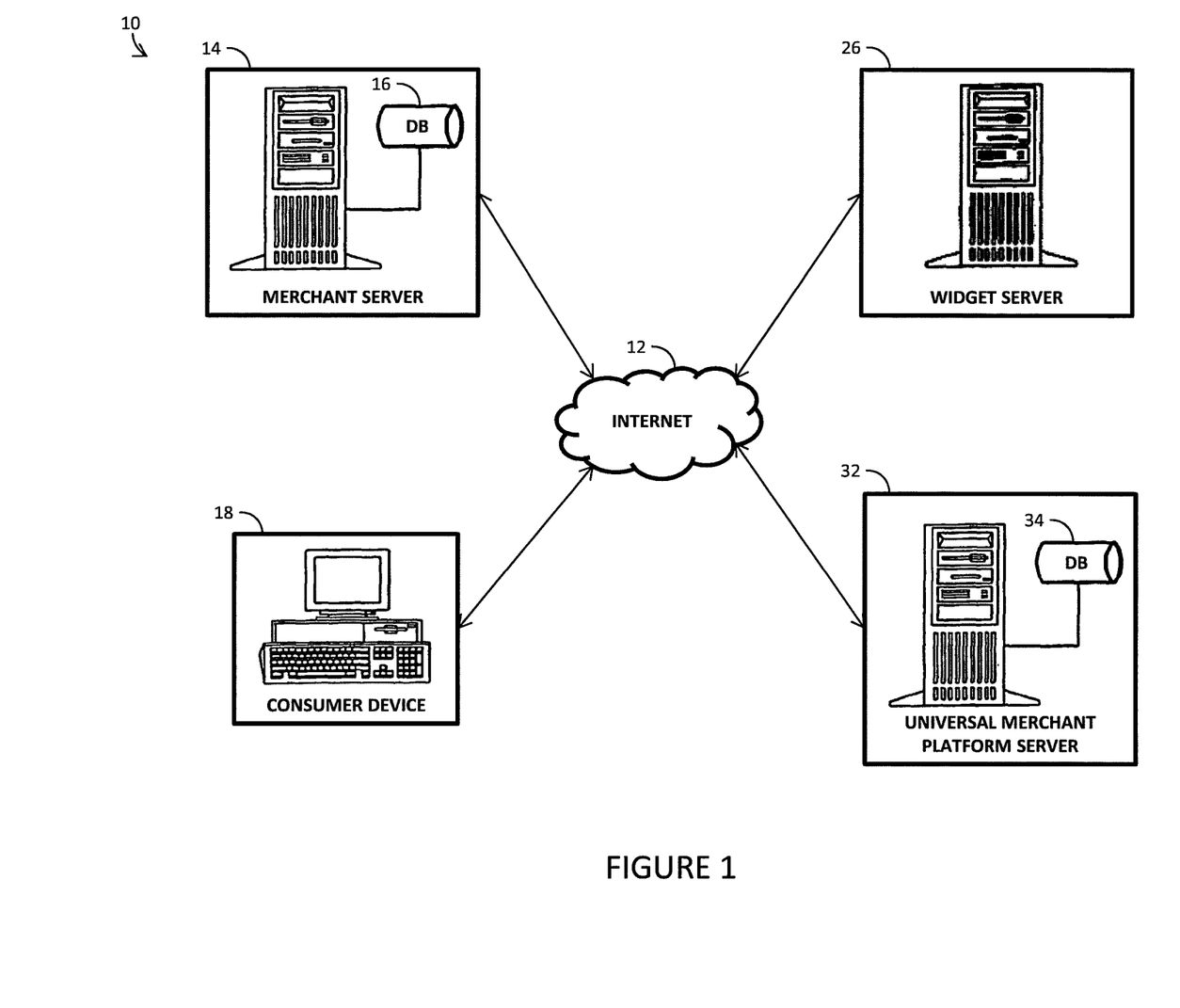
FIG. 1 is a schematic view of a payment system for processing an electronic commerce (e-commerce) transaction between a consumer and a merchant.
Figure 2:
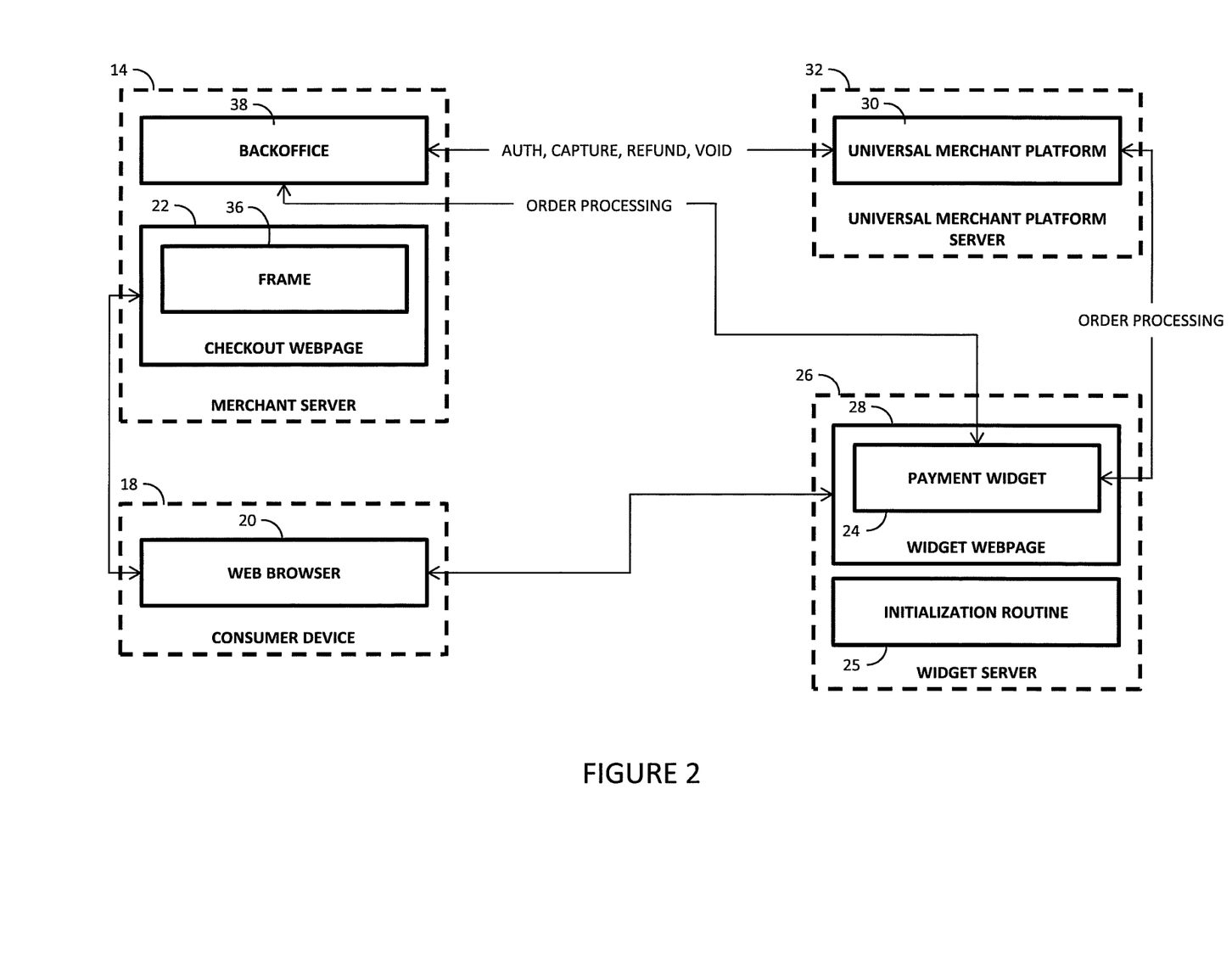
FIG. 2 is a block diagram of the payment system of FIG. 1 illustrating the workflow of the payment system.

With reference to FIGS. 1 and 2, a payment system 10 for processing an electronic commerce (e-commerce) transaction between a consumer and a merchant is provided. The e-commerce transaction relates to the buying and selling of one or more products and/or services between the consumer and the merchant over a communications network 12. The communications network 12 is typically the Internet, as illustrated, but other communications networks are also contemplated.

A merchant server 14 maintained by or for the merchant allows the consumer to access a virtual directory of products and/or services offered by the merchant over the communications network 12. The virtual directory is maintained on the merchant server 14, typically in a database 16 of the merchant server 14, and accessed by the consumer over the communications network 12 using a consumer device 18, such as a personal computer, a laptop, a smartphone, a tablet, and so on. Typically, the virtual directory is comprised of a set of one or more webpages (e.g., HyperText Markup Language (HTML) webpages) and accessed by the consumer using a web browser 20. The web browser 20 generally comprises a mechanism for accessing the Internet via the consumer device 18; therefore, it can also be a mobile browser, a mobile application, a tablet browser, a tablet application, etc.

Upon identifying a desired product and/or service, the consumer adds the product and/or service to a virtual shopping cart, typically maintained on the merchant server 14. Once the consumer has added all the desired products and/or services to the virtual shopping cart, the consumer proceeds to a checkout webpage 22 of the virtual shopping cart. Similar to the virtual directory, the virtual shopping cart is typically comprised of a set of one or more webpages and accessed by the consumer using a web browser 20.

The checkout webpage 22 allows the consumer to pay the merchant for the products and/or services added to the virtual shopping cart. Typically, payment is facilitated by a payment widget 24 displayed with the checkout webpage 22. A payment widget includes a set of graphical user interface (GUI) elements that allow the user to enter payment data needed to complete a transaction and a payment routine to process the payment data to complete the transaction. Typical GUI elements include, for example, any combination of text boxes, buttons, dialog boxes, pop-up windows, pull-down menus, icons, scroll bars, resizable window edges, progress indicators, selection boxes, windows, tear-off menus, menu bars, toggle switches and forms.

The payment widget 24 displayed with the checkout webpage 22 may include, for example, text boxes and a pull-down menu allowing the consumer to select a payment option and enter requisite data for the selected payment option. Payment options include traditional payment options, such as credit cards and debit cards, and alternative payment options, such as PAYPAL EXPRESS. Requisite data is dependent upon the selected payment option, but typically includes a consumer name, a card number, and an expiration data. Further, the payment widget 24 includes a payment routine to facilitate completion of the transaction using the data entered by the consumer.

To display the payment widget 24 with the checkout webpage 22, the checkout webpage 22 includes a static uniform resource locator (URL) to an initialization routine 25. A static URL is a URL which does not vary from transaction to transaction. The initialization routine 25 is typically JavaScript code. Further, the initialization routine 25 is typically loaded from a widget server 26 maintained by a service provider, but it can be loaded from another server, such as the merchant server 14. Upon loading the checkout webpage 22, the consumer device 18 loads and runs the initialization routine 25 from the static URL over the communications network 12.

When loading and running the initialization routine 25, initialization data may be passed from the merchant to the initialization routine 25 by way of the consumer device 18. Such data allows unique identification of the merchant and includes, for example, a unique merchant identifier. The initialization data can be passed to the initialization routine 25 by, for example, a query string of the static URL or an initialization function call that can include information such as transaction amount, etc.

Using the initialization data, the initialization routine 25 performs a lookup to identify a URL to a widget webpage 28 of the widget server 26 to which the payment widget 24 will be added. The lookup is performed with a universal merchant platform (UMP) 30 run on a UMP server 32 maintained by the service provider using the initialization data. For example, the initialization data is employed to lookup a unique record of the merchant in a database 34 of the UMP server 32, the record identifying the URL to the widget webpage 28. Similar to the checkout webpage 22, the widget webpage 28 is typically accessed by the consumer using a web browser 20.

Once the URL to the widget webpage 28 is identified, the initialization routine 25 segments the checkout webpage 22 into at least first and second regions, the second region typically being surrounded on all sides by the first region. The first region correspond the content of the checkout webpage 22, and the second region generally corresponds to the content of the widget webpage 28. The content of the second region is loaded and displayed independent of the content of the first region. Hence, by performing the segmentation, the consumer device 18 loads and displays the widget webpage 28 within the checkout webpage 22. To perform the segmentation, the initialization routine 25 can employ a frame or iframe element 36 according to HTML.

The widget webpage 28, upon being loaded from the widget server 26, loads and initializes one or more bootstrap routines for the payment widget 24. Other routines can also be loaded. The bootstrap routines are typically JavaScript code. Further, the bootstrap routines are typically loaded from the widget server 26, but the bootstrap routines can be loaded from another server, such as the merchant server 14. The bootstrap routines initialize the payment widget 24 and add the payment widget 24 to the widget webpage 28. Since the widget webpage 28 is displayed with the checkout webpage 22, the payment widget 24 is displayed with the checkout webpage 22.

In some instances where frames are used to display the widget webpage 28 with the checkout webpage 22, the widget server 26 includes security measures to prevent click jacking. Click jacking is a malicious technique of tricking a web user into clicking on something different from what the user perceives they are clicking on. These security measures are implemented through selective frame busting based on server side and Hypertext Transfer Protocol (HTTP) referrer checks. The frame busting prevents the widget webpage 28 from functioning when loaded inside selective frames. Further, the frame busting can be implemented with JavaScript code. The code can be dynamically updated to require a full or partial match between the server side and HTTP referrer to the domain or URL of the checkout webpage 22 registered to the service provider. The frame busing can also take into account certain HTTP headers, such as X-Frame-Options, X-Content-Security-Policy, X-WebKit-CSP.

With the payment widget 24 displayed with the checkout page 22, the payment widget 24 allows the consumer to select a payment option supported by the UMP 30 and allowed by the merchant. Payment options include traditional payment options, such as credit cards and debit card, as well as alternative payment options, such as GOOGLE CHECKOUT and PAYPAL EXPRESS. Upon selecting a payment option, a payment routine of the payment widget 24 coordinates the transaction according to the specific payment protocol of the selected payment type. A payment protocol describes the procedure by which a payment is processed for a payment option.

A payment protocol typically includes one or more stages, such as authentication, authorization and capture. Authentication pertains to authentication of the identity of the consumer. Authorization pertains to authorizing the transfer of funds from the funding source of the consumer to the funding destination of the merchant. Capture pertains to transferring the funds from the funding source of the consumer to the funding destination of the merchant. Authentication is typically performed before authorization, and authorization is typically performed before or simultaneous with capture.

In the case of credit cards, the payment protocol includes authorization followed by capture. Further, in some instances, such as where an authentication payment initiative is in place, the payment protocol can further include authentication. In the case of debit cards, the payment protocol includes a combined authorization and capture.

Where the selected payment option is a payment option supported by a backoffice system 38 of the merchant, typically traditional payment options, the payment widget 24 can collect the requisite payment data needed to process the transaction with the selected payment option. The collected payment data can then be returned to the checkout webpage 22. The collected payment data can be returned to the checkout webpage 22 by, for example, a JavaScript callback as a token representing the transaction. The checkout webpage 22, upon receiving the payment data, then submits the collected payment data to the backoffice system 38, optionally after adding additional data. Alternatively, the collected payment data can be returned directly to the backoffice system 38 without first passing through checkout page 22.

The backoffice system 38 upon receiving the payment data creates an order record within a database 16 of the merchant server 14 and typically coordinates with the UMP 30 to complete the transaction. The UMP 30 provides a unified protocol for processing transaction according to a plurality of different payment options, each with a different payment protocol. In that regard, the UMP 30 translates between the unified payment protocol and the specific payment protocol of a selected payment option. For more information, see, for example, U.S. Pat. No. 7,051,002 and U.S. Patent Application Publication No. 2006/0282382, both of which are incorporated herein by reference. Coordination with the UMP 30 typically includes authorizing the transfer of funds to the merchant, and capturing the funds to transfer the funds to the merchant, by way of the UMP 30.

To illustrate, supposing the consumer selected a credit card as the payment option, the payment widget 24 could collect a cardholder name, a cardholder number, an expiration date, and the address from the cardholder. This collected payment data could then be returned to the backoffice system 38, optionally via the checkout page 22. The backoffice system 38 them creates a record for the order and submits both an authorization and a capture request to the UMP 30, in that order.

Where the selected payment option is a payment option that is not supported by the backoffice system 38 of the merchant, typically an alternative payment option, the payment widget 24 can collect the requisite payment data needed to process the transaction with the selected payment option. The collected payment data is submitted to the UMP 30 to create a record of the transaction in a database 34 of the UMP server 32, the record associated with a virtual card number routable to the UMP 30. The virtual card number is typically a 16 digit, modulus 10 compatible number.

The virtual card number is returned to the checkout webpage 22 for processing of the transaction to completion. The card number can be returned to the checkout webpage 22 by, for example, a JavaScript callback. The checkout webpage 22, upon receiving the card number, then submits the card number to the backoffice system 38, optionally with additional data local to the checkout page or additional data received in the callback. Alternatively, the card number can be returned directly to the backoffice system 38 without first passing through checkout page 22.

The backoffice system 38 upon receiving the card number creates an order record within a database 16 of the merchant server 14 and typically coordinates with the UMP 30 to complete the transaction using the card number as if the transaction was paid for using a credit card. Coordination with the UMP 30 typically includes authorizing the transfer of funds to the merchant using the credit card. Since the authorization request is routable to the UMP 30, the authorization request typically ends up at the UMP 30, even if the request is not directly sent to the UMP 30. In response to the authorization request, the UMP 30 takes any needed action to authorize the transaction. Subsequently, the funds are captured using the card number. As with the authorization request, the capture request is routable to the UMP 30 and the UMP 30 takes appropriate action to capture the funds in response to the capture request.

The back office 38 can also be employed to provide consumers with refunds or to void transactions. In such instances, the back office 38 simply follows the normal procedure for carrying out a refund or voiding a transaction. Typically, this includes integration with the UMP 30, but it is not necessary.

Advantageously, the foregoing approach to displaying the payment widget 24 can increase the speed with which the bootstrap routines are loaded and reduce the likelihood with which errors arise can, since the bootstrap routines are typically centralized at the widget server 26 and not distributed as traditionally done. Further, the foregoing approach to displaying the payment widget 24 does not run into limitations associated with off-the shelf or third party hosted shopping carts and checkout webpages. Namely, because the widget webpage 28 is hosted by the widget server 26, JavaScript or HTTP header options can be adjusted as needed for the payment widget 24.

While the foregoing described the backoffice 38 and the checkout page 22 as being managed by a common merchant server 14, it is to be understood that each of these merchant components 22, 38 can be distributed across a set of one or more merchant servers (e.g., a plurality of merchant servers), the sets of which being disjoint, or partially or wholly overlapping. Similarly, while the foregoing described the UMP 30 and the payment webpage 28 as each being managed by a single UMP server 32 and a single widget server 26, respectively, it is to be understand that each of these components 30, 28 can be distributed across a set of one or more servers (e.g., a plurality of servers), the sets of which being disjoint, or partially or wholly overlapping.

Even more, while the foregoing only described a single merchant, a single consumer, and a single transaction, it is to be understood that a plurality of transactions can be performed between the merchant and the consumer. Further, a plurality of merchants and/or a plurality of consumers can be accommodated. In such instances, the system 10 merely includes additional merchant servers 14 and/or consumer devices 18, which remain as described above. Even more, where the system 10 includes a plurality of merchants and/or a plurality of consumers, the system 10 can process transactions for a plurality of different merchant-consumer pairs.

Figure 3:
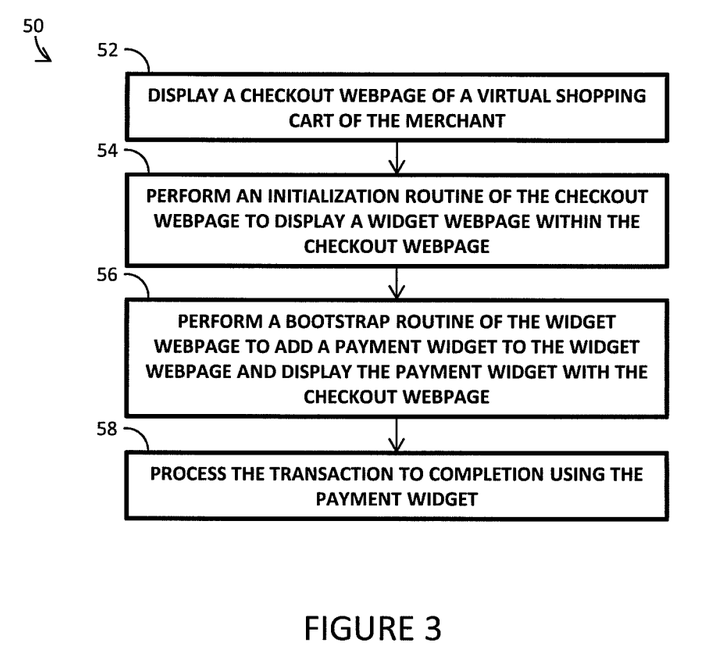
FIG. 3 is a block diagram of a payment method for processing an e-commerce transaction between a consumer and a merchant.

With reference to FIG. 3, a method 50 for processing an electronic commerce transaction between a consumer and a merchant over a communications network 12 is provided. The method 50 is suitably performed by a web browser 20 of a consumer device 18 of the consumer after the consumer has added products and/or services to purchase to a virtual shopping cart of the merchant.

To add products and/or services to the shopping card, a directory of products or services of the merchant is displayed to the consumer. The directory is loaded from a server 14 of the merchant over the communications network 12. A selection of a product or service of the directory is received from the consumer, and the selected product or service is added to the virtual shopping cart over the communications network 12.

According to the method 50, a checkout webpage 22 of the virtual shopping cart of the merchant is displayed to the consumer within a web browser 20. The checkout webpage 22 is loaded from a server 14 of the merchant over the communications network 12.

An initialization routine 25 of the checkout webpage 22 is performed 54, typically upon loading the checkout webpage 22. The initialization routine 25 segments the checkout webpage 22 to display a widget webpage 28 of the service provider within the checkout webpage 22. Content of the widget webpage 28 is loaded and displayed independent of content of the checkout webpage 22. Further, the checkout webpage 22 and the widget webpage 28 are typically displayed together in a common window of the web browser 20. The widget webpage 28 is loaded from a server 26 of the service provider over the communications network 12.

In some instances, the initialization routine 25 further looks up a universal resource locator (URL) of the widget webpage 28 by data uniquely identifying the merchant. The lookup performed in a database 34 of the UMP 30 over the communications network 12. In such instances, the widget webpage 28 is loaded from the URL over the communications network 12.

To load the initialization routine 25, the checkout webpage 22 typically includes a universal resource locator (URL) pointing to the initialization routine 25, the initialization routine 25 being on a server 26 of the service provider. Upon loading the checkout webpage 22, the initialization routine 25 is loaded from the URL over the communications network 12. Suitably, the URL is static and does not vary for different transactions.

A bootstrap routine of the widget webpage 28 is performed 56, typically upon loading the widget webpage 28, to add a payment widget 24 to the widget webpage 28 and to display the payment widget 24 with the checkout webpage 22. The bootstrap routine is suitably loaded from a server 26 of a service provider over the communications network 12.

Once the payment widget 24 is added to the widget webpage 28, the transaction is processed 58 to completion using the payment widget 24. The processing suitably includes collecting payment data from the consumer with the payment widget 24, returning at least some of the collected payment data to a backoffice system 38 of the merchant, and processing the returned payment data by the backoffice system 38 to transfer funds between the consumer and the merchant and to complete the transaction. In some instances, the processing is performed through integration of the payment widget 24 with a universal merchant platform (UMP) 30. The UMP 30 provides a unified payment protocol for a plurality of different payment options, each payment option including a different payment protocol.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by smartphone or personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for processing an electronic commerce transaction over a communications network, the system comprising:
   at least one server of a service provider different than a merchant server, the at least one server of the service provider configured to:
       provide an initialization routine of a checkout webpage, the checkout webpage being part of a virtual shopping cart of the merchant server and displayed to a consumer, wherein the checkout webpage includes a first universal resource locator (URL) pointing to the initialization routine on the at least one server of the service provider, and wherein the first URL is static and does not vary for different transactions;
       provide the initialization routine from the first URL over the communications network to a consumer device,
       wherein the initialization routine causes a lookup to be performed with a universal merchant platform (UMP) run on a UMP server, wherein the lookup, using a unique identifier of a merchant associated with the merchant server, identifies a second URL to a widget webpage of the service provider in a database of the UMP server, wherein a payment widget is to be added to the widget webpage of the service provider, and the initialization routine segments the checkout webpage to display the widget webpage of the service provider within the checkout webpage, wherein content of the widget webpage being loaded and displayed independent of content of the checkout webpage, wherein the segmenting divides the checkout webpage into a first region and a second region, the first region displaying content of the checkout webpage, and the second region displaying content of the widget webpage;
       centralize a bootstrap routine of the widget webpage;
       provide the bootstrap routine of the widget webpage to add the payment widget to the widget webpage and display the payment widget with the checkout webpage, wherein the payment widget provides a selection of a plurality of payment options supported by the UMP and allowed by the merchant associated with the merchant server, wherein frames are used to display the widget webpage;
       include security measures to prevent click jacking, wherein the security measures comprise measures implemented through a frame busting technique, wherein the frame busting technique is configured to prevent the widget webpage of the service provider from functioning when loaded inside a selective frame of a webpage;
       collect payment data from the consumer using the payment widget;
       provide the collected payment data from the payment widget to the checkout webpage; and
       process the transaction to completion via the UMP using the collected payment data based on a payment protocol of a selected payment option of the plurality of payment options.

2. The system according to claim 1, further comprising the consumer device of the consumer configured to load the bootstrap routine from the at least one server of the service provider over the communications network.

3. A method for processing an electronic commerce transaction between a consumer device and a merchant server over a communications network, said method comprising:
   with at least one server of a service provider different than the merchant server:
       providing an initialization routine of a checkout webpage, the checkout webpage being part of a virtual shopping cart of the merchant server and displayed to the consumer device, wherein the checkout webpage includes a first universal resource locator (URL) pointing to the initialization routine on the at least one server of the service provider, and wherein the first URL is static and does not vary for different transactions;
       provide the initialization routine from the first URL over the communications network to a consumer device, wherein the initialization routine causes a lookup to be performed with a universal merchant platform (UMP) run on a UMP server, wherein the lookup, using a unique identifier of a merchant associated with the merchant server, identifies a second URL to a widget webpage of the service provider, wherein a payment widget is to be added to the widget webpage of the service provider, and the initialization routine segments the checkout webpage to display the widget webpage of the service provider within the checkout webpage, wherein content of the widget webpage being loaded and displayed independent of content of the checkout webpage, wherein the segmenting divides the checkout webpage into a first region and a second region, the first region displaying content of the checkout webpage, and the second region displaying content of the widget webpage;

providing a bootstrap routine of the widget webpage to add the payment widget to the widget webpage and display the payment widget with the checkout webpage, wherein the payment widget provides a selection of a plurality of payment options supported by the UMP and allowed by the merchant associated with the merchant server, wherein frames are used to display the widget webpage;

including security measures to prevent click jacking, wherein the security measures comprise measures implemented through a frame busting technique, wherein the frame busting technique is configured to prevent the widget webpage of the service provider from functioning when loaded inside a selective frame of a webpage;

collecting payment data from the consumer device using the payment widget;

provide the collected payment data from the payment widget to the checkout webpage; and processing the transaction to completion via the UMP using the collected payment data based on a payment protocol of a selected payment option of the plurality of payment options.

4. The method according to claim 3, wherein the method further comprises, with the at least one server of the service provider, preventing click jacking using the security measures.

5. The method according to claim 3, further comprising centralizing the bootstrap routine at the at least one server of the service provider.

6. The method according to claim 3, further comprising: over the communications network, loading the bootstrap routine from the at least one server of the service provider to the consumer device.

7. A computer program product for processing an electronic commerce transaction between a consumer device and a merchant server over a communications network, comprising at least one non-transitory computer-readable medium including program instructions that, when executed by at least one processor, cause the at least one processor to:

provide an initialization routine of a checkout webpage, the checkout webpage being part of a virtual shopping cart of the merchant server and displayed to a consumer, wherein the checkout webpage includes a first universal resource locator (URL) pointing to the initialization routine on the at least one server of the service provider, and wherein the first URL is static and does not vary for different transactions;

provide the initialization routine from the first URL over the communications network to a consumer device, wherein the initialization routine causes a lookup to be performed with a universal merchant platform (UMP) run on a UMP server, wherein the lookup, using a unique identifier of a merchant associated with the merchant server, identifies a second URL to a widget webpage of a service provider, wherein a payment widget is to be added to the widget webpage of the service provider, and the initialization routine segments the checkout webpage to display the widget webpage of the service provider within the checkout webpage, wherein content of the widget webpage being loaded and displayed independent of content of the checkout webpage, wherein the segmenting divides the checkout webpage into a first region and a second region, the first region displaying content of the checkout webpage, and the second region displaying content of the widget webpage;

centralize a bootstrap routine of the widget webpage;

provide the bootstrap routine of the widget webpage to add the payment widget to the widget webpage and display the payment widget with the checkout webpage, wherein payment widget provides a selection of a plurality of payment options supported by the UMP and allowed by the merchant associated with the merchant server;

include security measures to prevent click jacking, wherein the security measures comprise measures implemented through a frame busting technique, wherein the frame busting technique is configured to prevent the widget webpage of the service provider from functioning when loaded inside a selective frame of a webpage;

collect payment data from the consumer using the payment widget;

provide the collected payment data from the payment widget to the checkout webpage; and process the transaction to completion using the collected payment data based on a payment protocol of a selected payment option of the plurality of payment options.

8. The system of claim 1, further comprising the merchant server, wherein the merchant server is configured to:

create an order record for the transaction within a database of the merchant server based on receiving the collected payment data;

provide an authorization request for the transaction to the UMP on the UMP server; and provide a capture request for the transaction to the UMP on the UMP server.

9. The system of claim 1, further comprising the UMP on the UMP server, wherein the UMP on the UMP server is configured to:

based on the selected payment option not being supported by the merchant server, create a record for the transaction within a database of the UMP server based on receiving the collected payment data, wherein the record is associated with a virtual card number that is routable to the UMP on the UMP server; and provide the virtual card number to the checkout webpage.

10. The system of claim 1, further comprising the merchant server, wherein the merchant server is configured to:

create an order record for the transaction within a database of the merchant server based on receiving the virtual card number;

the UMP on the UMP server is further configured to:

authorize the transaction in response to receiving an authorization request for the transaction; and capture funds for the transaction in response to receiving a capture request for the transaction.

11. The method of claim 3, further comprising:
creating an order record for the transaction within a database of the merchant server based on receiving the collected payment data;
providing an authorization request for the transaction to the UMP on the UMP server; and
providing a capture request for the transaction to the UMP on the UMP server.

12. The method of claim 3, further comprising:
based on the selected payment option not being supported by the merchant server, creating a record for the transaction within a database of the UMP server based on receiving the collected payment data, wherein the record is associated with a virtual card number that is routable to the UMP on the UMP server; and
providing the virtual card number to the checkout webpage.

13. The method of claim 3, further comprising:
creating an order record for the transaction within a database of the merchant server based on receiving the virtual card number;
authorizing the transaction in response to receiving an authorization request for the transaction; and
capturing funds for the transaction in response to receiving a capture request for the transaction.

14. The computer program product of claim 7, wherein the program instructions further cause the at least one processor to:
create an order record for the transaction within a database of the merchant server based on receiving the collected payment data;
provide an authorization request for the transaction to the UMP on the UMP server; and
provide a capture request for the transaction to the UMP on the UMP server.

15. The computer program product of claim 7, wherein the program instructions further cause the at least one processor to:
based on the selected payment option not being supported by the merchant server, create a record for the transaction within a database of the UMP server based on receiving the collected payment data, wherein the record is associated with a virtual card number that is routable to the UMP on the UMP server; and
provide the virtual card number to the checkout webpage.

16. The computer program product of claim 7, wherein the program instructions further cause the at least one processor to:
create an order record for the transaction within a database of the merchant server based on receiving the virtual card number;
authorize the transaction in response to receiving an authorization request for the transaction; and
capture funds for the transaction in response to receiving a capture request for the transaction.

\* \* \* \* \*